(12) United States Patent
Morecroft et al.

(10) Patent No.: US 12,468,077 B2
(45) Date of Patent: Nov. 11, 2025

(54) INTERFERENCE FILTER, OPTICAL DEVICE AND METHOD OF MANUFACTURING AN INTERFERENCE FILTER

(71) Applicant: ams-Osram AG, Premstätten (AT)

(72) Inventors: Deborah Morecroft, Premstätten (AT); Gerhard Eilmsteiner, Leoben (AT); Manuel Koch, Antwerp (BE)

(73) Assignee: AMS-OSRAM AG, Premstätten (AT)

( * ) Notice: Subject to any disclaimer, the term of this patent is extended or adjusted under 35 U.S.C. 154(b) by 530 days.

(21) Appl. No.: 17/913,994

(22) PCT Filed: Mar. 24, 2021

(86) PCT No.: PCT/EP2021/057621
§ 371 (c)(1),
(2) Date: Sep. 23, 2022

(87) PCT Pub. No.: WO2021/191304
PCT Pub. Date: Sep. 30, 2021

(65) Prior Publication Data
US 2023/0130384 A1     Apr. 27, 2023

(30) Foreign Application Priority Data
Mar. 25, 2020   (EP) .................................... 20165583

(51) Int. Cl.
G02B 5/28     (2006.01)
G02B 5/20     (2006.01)
H04N 23/55    (2023.01)

(52) U.S. Cl.
CPC ............ G02B 5/281 (2013.01); G02B 5/207 (2013.01); H04N 23/55 (2023.01)

(58) Field of Classification Search
CPC ......... G02B 5/281; G02B 5/207; H04N 23/55
(Continued)

(56) References Cited

U.S. PATENT DOCUMENTS

2002/0090184 A1* 7/2002 Sayag ................... G11C 13/04
                                                             365/111
2008/0129174 A1   6/2008 Schafer
(Continued)

FOREIGN PATENT DOCUMENTS

CN   102955187 A   3/2013
CN   103843466 A   6/2014
(Continued)

OTHER PUBLICATIONS

First Office Action issued in corresponding Chinese Patent Application No. 202180020983.3 mailed on Jan. 10, 2024, with English language translation, 10 pages.
(Continued)

*Primary Examiner* — Bumsuk Won
*Assistant Examiner* — Mitchell T Oestreich
(74) *Attorney, Agent, or Firm* — MH2 Technology Law Group LLP (57) ABSTRACT

An interference filter comprises a substrate, a filter stack and at least one absorption layer. The filter stack comprises alternating layers of optical coatings with different refractive indices arranged on the substrate. The at least one absorption layer is comprised of an optically absorbing material which is arranged on the substrate.

10 Claims, 13 Drawing Sheets

(58) Field of Classification Search
USPC .......................................................... 359/584
See application file for complete search history.

(56) References Cited

U.S. PATENT DOCUMENTS

| | | |
|---|---|---|
| 2014/0299955 A1 | 10/2014 | Yoshizawa |
| 2015/0001566 A1 | 1/2015 | Barchmann et al. |
| 2016/0109628 A1* | 4/2016 | Weber .................. G02B 5/0816 359/359 |
| 2017/0017023 A1 | 1/2017 | Sugiyama et al. |
| 2018/0364095 A1 | 12/2018 | Nagaya et al. |
| 2019/0346601 A1 | 11/2019 | Kubo et al. |

FOREIGN PATENT DOCUMENTS

| | | |
|---|---|---|
| CN | 110114704 A | 8/2019 |
| EP | 2381280 A1 | 10/2011 |
| EP | 1837920 A1 | 2/2012 |
| JP | 2013137487 A | 7/2013 |

OTHER PUBLICATIONS

Third Office Action issued in corresponding Chinese Patent Application No. 202180020983.3 mailed on Nov. 30, 2024, with English language translation, 8 pages.
Gangl, Martin (EP Authorized Officer), International Search Report and Written Opinion in corresponding International Application No. PCT/EP2021/057621 mailed on May 28, 2021, 12 pages.

* cited by examiner

INTERFERENCE FILTER, OPTICAL DEVICE AND METHOD OF MANUFACTURING AN INTERFERENCE FILTER

CROSS-REFERENCE TO RELATED APPLICATIONS

The present application is the national stage entry of International Patent Application No. PCT/EP2021/057621, filed on Mar. 24, 2021, and published as WO 2021/191304 A1 on Sep. 30, 2021, which claims the benefit of priority of European Patent Application No. 20165583.4, filed on Mar. 25, 2020, all of which are incorporated by reference herein in their entirety.

FIELD OF THE INVENTION

This invention relates to an interference filter, an optical device and method of manufacturing an interference filter.

BACKGROUND OF THE INVENTION

An optical filter is generally considered a device that selectively transmits light of different wavelengths. Typically, an optical filter is implemented using a substrate such as a glass or plastic plane, which are either dyed in the bulk or have interference coatings. With respect to filter design there are typically two categories of filters. Dichroic or interference filters are designed based on transmission and reflection. Layers of high and low index materials are stacked to form multilayers. The materials are deliberately chosen with low absorption in the wavelength region of interest. Absorption filters are commonly manufactured from dyed or colored glass or from pigmented gelatin resins and operate by attenuating the light through absorption at specific wavelengths. For dielectric dichroic filters reflection and transmission are inversely coupled, which can lead to problems for some specific applications such as for image sensor applications.

Figure 4:
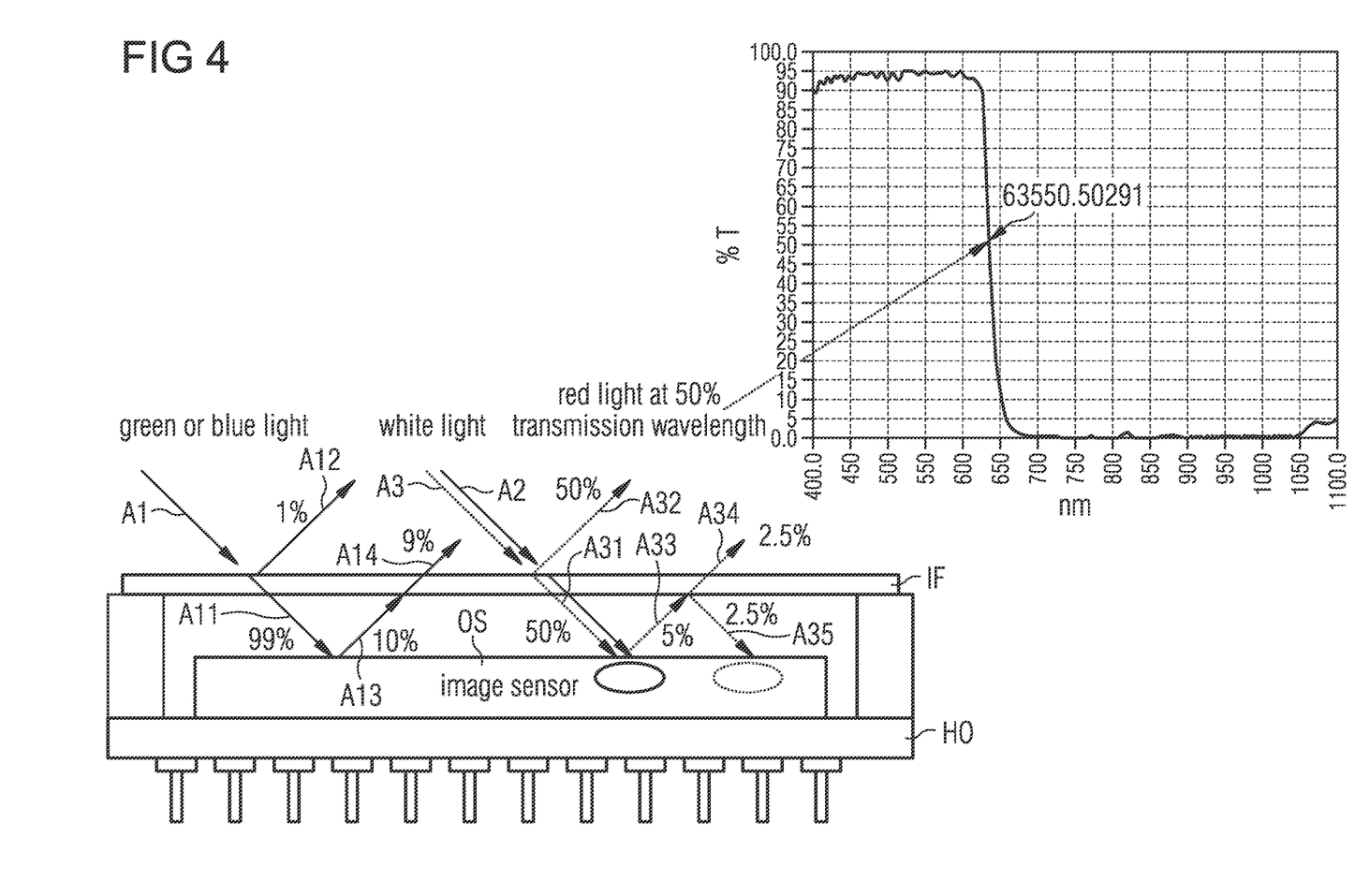
FIG. 4 shows an optical sensor arrangement with an interference filter from the prior art.

FIG. 4 shows an optical sensor arrangement with an interference filter from the prior art. The optical sensor arrangement comprises an optical sensor OS, such as an image sensor, which is arranged in a housing HO behind the interference filter IF. The interference filter in this example is an infrared, IR, cut-off filter or short-pass filter and, thus, is designed to reflect or block mid-infrared wavelengths while passing visible light, for example. The transmission spectrum of this filter is depicted in the inset of FIG. 4. The spectrum shows a cut-on wavelength at 635 nm. Cut-off wavelength is a term used to denote the wavelength at which the transmission decreases to 50% throughput in a short-pass filter. The cut-off wavelength is denoted by $\lambda_{cut-off}$. Cut-on wavelength is denoted by $\lambda_{cut-on}$ and corresponds to the wavelength at which the transmission increases to 50% throughput in a long-pass filter. Band pass filters have both cut-on and cut-off wavelengths.

The drawing shows several arrows of incident light being transmitted or reflected at optical interfaces of the optical sensor arrangement. The percentages in the drawing are given as relative intensities with an intensity of incident light $I_{in}$ being equal to 100%. Arrow A1 in the drawing indicates green or blue incident light. Such light passes the filter with a high transmission, e.g. 99% as indicated by arrow A11. A smaller amount of light is reflected at the interference filter, e.g. 1% as indicated by arrow A12. The passed light strikes the optical sensor OS and is mostly absorbed by the sensor or the substrate of the sensor. A certain amount, represented by arrow A13, such as 10%, is reflected back towards the interference filter IF. The filter passes again most of the incident light, represented by arrow A14, e.g. some 9.9% of the incident light is reflected via the filter and sensor.

The situation is somewhat different if white light is incident on the optical sensor arrangement. White light has contributions of green or blue incident light similar to the case discussed above, and is represented by the arrow A2 in the drawing. Arrow A3 represents light at the cut-on wavelength, e.g. at 635 nm. Such light is transmitted with 50% and reflected with 50% (see arrows A31 and A32, respectively). Again a certain amount, represented by arrow A33, such as 5%, is reflected from the sensor back towards the interference filter IF. The filter, however, passes and reflects the light at the cut-on wavelength equally. For example, the filter passes another amount of incident light, represented by arrow A34, e.g. some 2.5%. In addition, represented by arrow A35, a certain amount is reflected back towards the optical sensor, e.g. another 2.5%. This back-reflection or internal reflections is a common problem and leads to undesired signal and, thus, reduces signal-to-noise ratio in optical sensor systems.

Figure 5A:
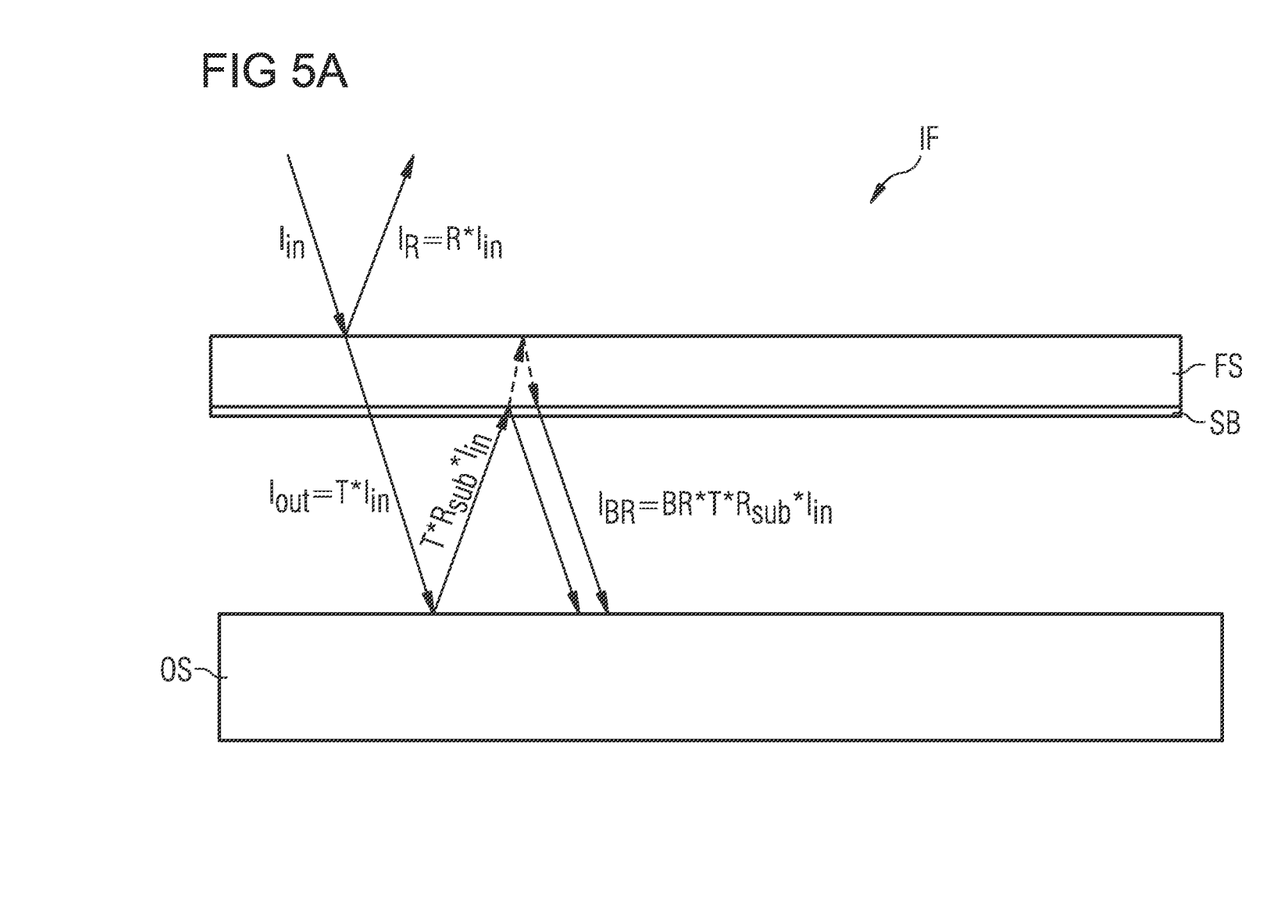
FIGS. 5A to 5C show shows an example of back-reflection for a prior art interference filter at normal incidence.
Figure 5B:
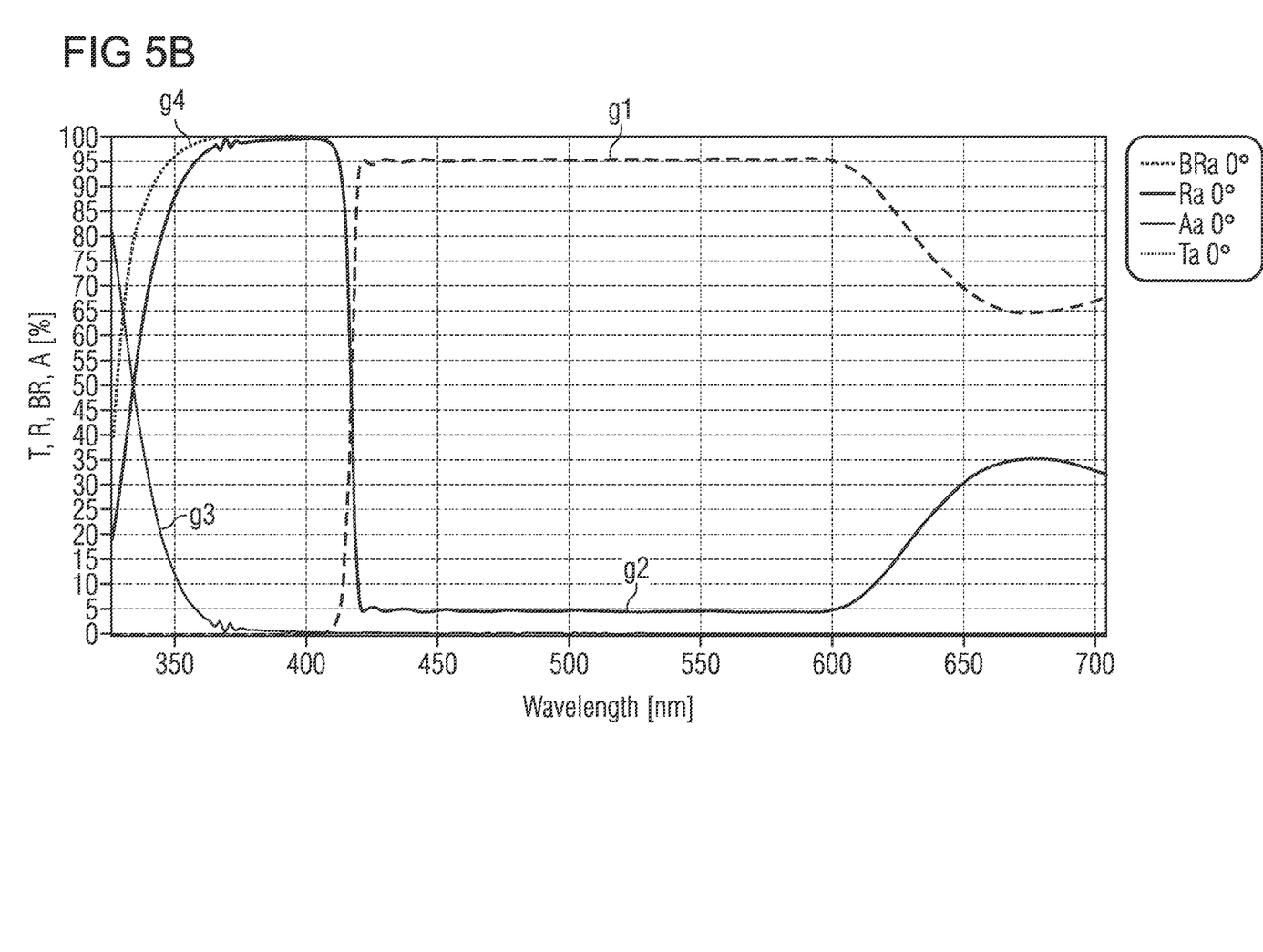
Figure 5C:
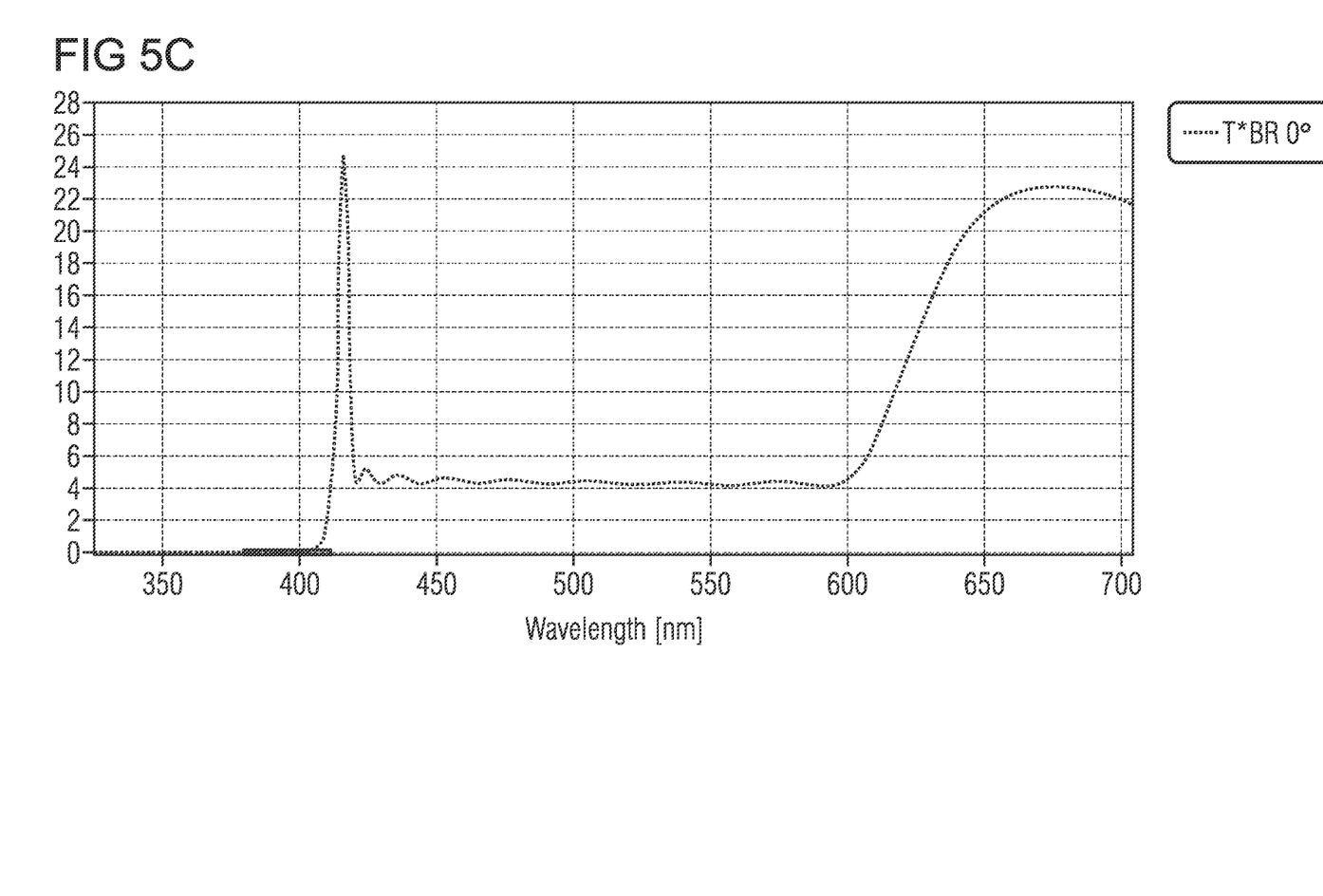

FIGS. 5A to 5C show an example of back-reflection in a prior art interference filter. FIG. 5A depicts a dichroic filter comprising a substrate SB and a filter stack FS of alternating layers of optical coatings with different refractive indices. The interference filter is arranged at a distance to the optical sensor OS.

Light is incident with an intensity denoted $I_{in}$. The incident light is partly reflected at the filter stack FS. The reflected light has an intensity of $I_r = R \cdot I_{in}$, wherein R denotes a reflection coefficient, or relative reflection contribution. Some light, however, eventually gets transmitted through the filter stack, according to its transmission spectrum. The transmitted intensity is given as $I_{out} = T \cdot I_{in}$, wherein T denotes a transmission coefficient, or relative transmission contribution. The transmitted light may then be reflected at the optical sensor, e.g. at its substrate. The reflected intensity is given as $T \cdot R_{sub} \cdot I_{in}$, wherein $R_{sub}$ denotes a reflection coefficient, or relative reflection contribution of the sensor. Some of this reflected light may be transmitted back into the filter stack FS, and may undergo additional reflections inside the filter stack (see doted arrow in the drawing). Moreover, there may be another reflection at the filter stack back towards the optical sensor. This "back-reflected" light has an intensity of $I_{br} = BR \cdot T \cdot R_{sub} \cdot I_{in}$, wherein BR denotes a back-reflection coefficient, or relative back-reflection contribution.

FIG. 5B shows transmission and reflection contributions for the prior art interference filter. All graphs assume normal incidence. Furthermore, a substrate reflection is assumed to be 100%. The graphs g1 and g2 show the transmission and reflection coefficients introduced above as functions of wavelength, respectively. Graph g3 indicates absorption of the filter stack FS as a function of wavelength. Finally, graph g4 shows the back-reflection coefficient as a function of wavelength. The graphs g1 and g2 intersect at the cut-on wavelength and are essentially inverse for wavelengths larger than the cut-on. This is characteristic of a long-pass filter.

FIG. 5C shows transmission and back-reflection contributions for the prior art interference filter. This graph represents a product of back-reflection coefficient BR and transmission coefficient T as functions of wavelength. The peak indicates that the back-reflected intensity is ~25% of the incoming light at the cut-off.

Figure 6A:
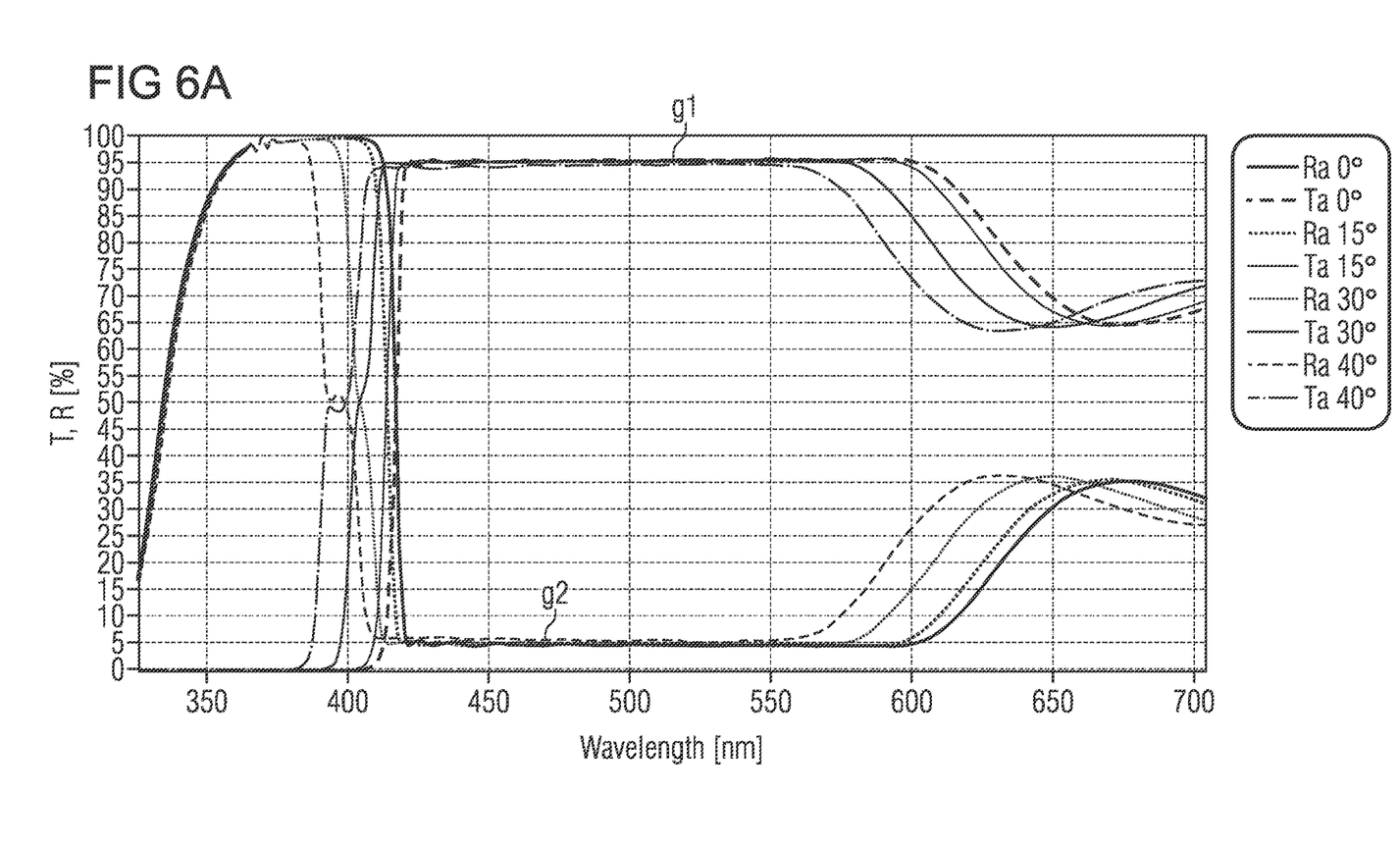
FIGS. 6A to 6B show an example of back-reflection in a prior art interference filter at various angles of incidence.
Figure 6B:
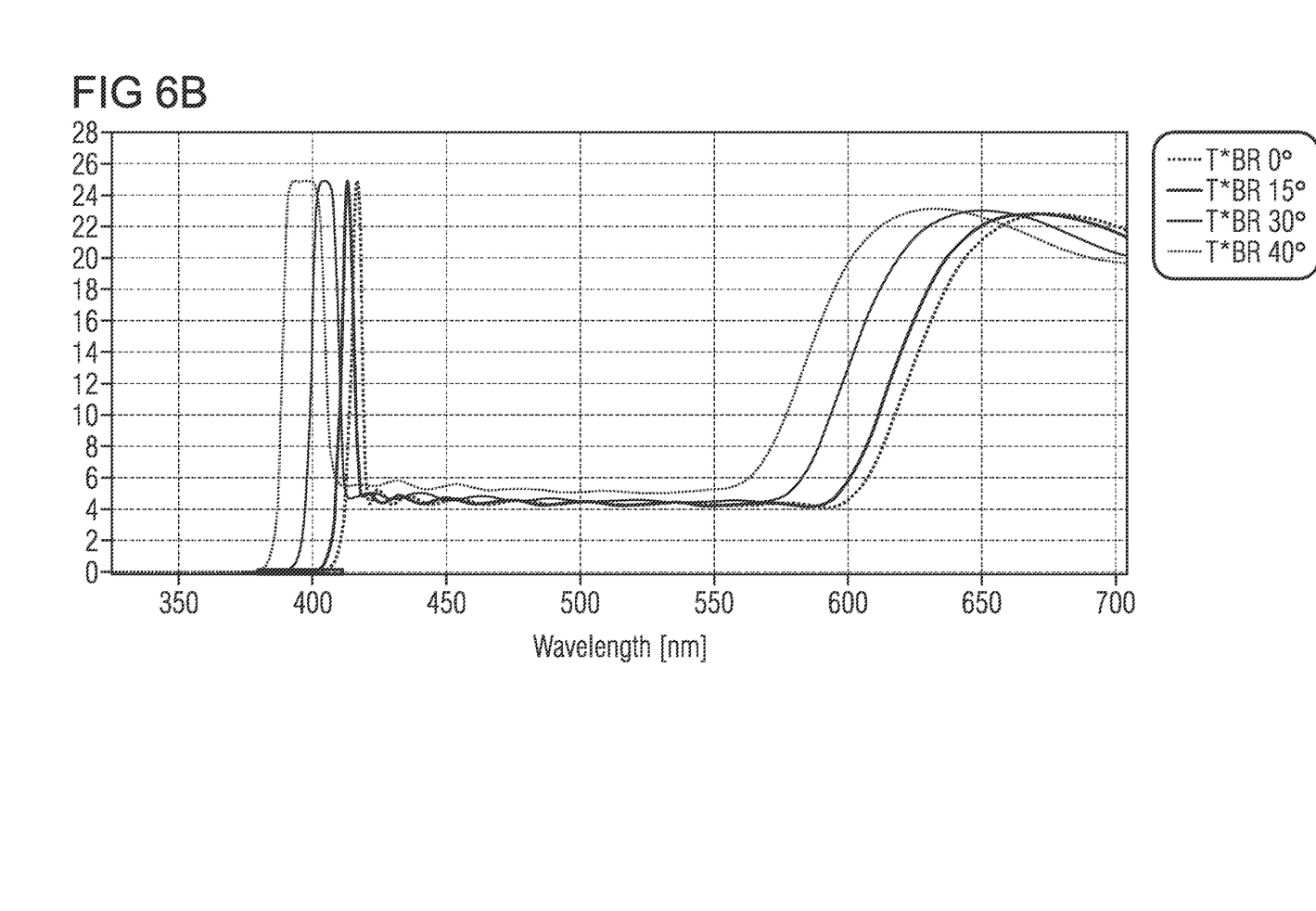

FIGS. 6A and 6B show another example of back-reflection in the prior art interference filter IF of FIG. 5A. In fact, the drawings correspond to those in FIGS. 5B and 5C but are simulated for different angles of incidence, AOI, i.e. 0°, 15°, 30°, and 40°. The situation is similar to normal incidence in that for higher AOIs the maximum back-reflected intensity essentially remains at 25%. Furthermore, the peaks get spectrally broader for higher AOIs.

It is an objective to provide an interference filter, an optical device and a method of manufacturing an interference filter which allows for reducing the impact of back-reflection.

These objectives are achieved by the subject matter of the independent claims. Further developments and embodiments are described in dependent claims.

SUMMARY OF THE INVENTION

It is to be understood that any feature described in relation to any one embodiment may be used alone, or in combination with other features described herein, and may also be used in combination with one or more features of any other of the embodiments, or any combination of any other of the embodiments unless described as an alternative. Furthermore, equivalents and modifications not described below may also be employed without departing from the scope of the interference filter, optical device and method of manufacturing an interference filter which are defined in the accompanying claims.

The following relates to an improved concept in the field of optical filters. The proposed concept offers a solution to undesirable back-reflection in optical filters, such as dichroic filters, based on a hybrid filter design. One aspect relates to decoupling of transmission and reflection from each other by introducing an absorption layer with optically absorbing materials. Back-reflection can be shifted to shorter wavelengths and lower levels. The back-reflected intensity can be reduced by a factor of about five compared to an all dielectric filter, for example.

In at least one embodiment an interference filter comprises a substrate, a filter stack and at least one absorption layer. The filter stack comprises alternating layers of optical coatings with different refractive indices arranged on the substrate. The at least one absorption layer is comprised of an optically absorbing material which is arranged on the substrate.

The substrate provides the base of the interference filter, or dichroic filter. For example, the optical coatings are arranged on the substrate by means of coating technology. A series of optical coatings may be coated on the substrate.

These coatings may have different material properties, such as different refractive indices. The material properties can be chosen so that an unwanted portion of light is reflected while the remainder is transmitted to a certain degree. Furthermore, reflected and transmitted light may interfere with each other. For example, the alternating layers form a sequential series of reflective cavities that resonate with the desired wavelength or wavelengths. Other wavelengths destructively cancel or reflect as the peaks and troughs of the waves overlap.

The interference filter comprises the filter stack and the at least one absorption layer. This is to say that that, considered as a whole, the filter stack and the at least one absorption layer form an interference filter. The filter may be considered a hybrid interference filter. Absorption filters alone are usually made from a substrate such as glass to which various inorganic or organic compounds have been added. These compounds, or optically absorbing materials, absorb at some wavelengths of light while transmitting others. The compounds can also be added to other substrates such as plastic (often polycarbonate or acrylic) to produce gel filters, which are lighter and cheaper than glass-based filters.

It has been found that by introducing the absorption layer made from an optically absorbing material the effect of back-reflection can be reduced significantly. For example, the back-reflected intensity can be reduced by a factor of 5 or more compared to an all dielectric filter.

In at least one embodiment the at least one absorption layer is arranged on a surface of the filter stack. In addition, or alternatively, the at least one absorption layer is arranged between layers of the filter stack.

This is to say that the absorption layer is associated with the filter stack in the sense that the absorption layer can be considered an integral part of the filter stack, e.g. as one of the alternating layers or an additional layer of the filter stack. This is opposed to a colored glass, for example. Such glasses are often used as absorption filters and may have optically absorbing material added into the glass. For example, there may be a distance between the absorption layer and the filter stack with respect to the substrate.

The at least one absorption layer has an absorption spectrum, e.g. characterized by an absorption spectrum or absorption coefficient of its optically absorbing material. Back-reflection of light originates from reflection off of the substrate or light sensitive surface of an optical sensor. Such reflected light, however, needs to travel via the absorption layer. By way of absorption the intensity of reflected light can be reduced and, thus, back-reflection can be decreased in intensity.

In the embodiments discussed herein there may be more than a single absorption layer. For example, a given optically absorbing material may not absorb sufficiently the reflected light. Thus, a combination of optically absorbing materials, either arranged in the same absorption layer or in different absorption layers may increase absorption to a desired level. Furthermore, the absorption layers may also be arranged at different levels of the filter stack, i.e. at different distances with respect to the substrate. This way several levels of absorption may be established, decreasing further the back-reflection.

In at least one embodiment the at least one absorption layer is arranged on a surface of the filter stack facing the substrate. Arranging an absorption layer at least on a surface of the filter stack facing the substrate may have the largest effect on reducing back-reflection. Furthermore, this may be a rather cost efficient way as the absorption layer may be coated on the filter stack rather than being incorporated into the filter stack.

In at least one embodiment a surface of the substrate facing the filter stack has a finite distance to the at least one absorption layer. Furthermore, there may be a distance between the at least one absorption layer and the substrate, e.g. established by an intermediate layer, such as a dielectric layer, or by means of a spacer between absorption layer, and/or filter stack, and the substrate. The distance may be used to reduce the effect of spectral broadening.

In at least one embodiment the layers of optical coatings are characterized by an overall transmission spectrum and an overall reflection spectrum. The overall transmission spectrum and the overall reflection spectrum are coupled. For example, the two spectra are entangled such that the course of the overall transmission spectrum determines the course of the overall reflection spectrum and vice versa. The at least one absorption layer has an absorption spectrum which is arranged to decouple the overall transmission spectrum and the overall reflection spectrum.

For example, in common dichroic filters the overall transmission spectrum and the overall reflection spectrum are coupled. This fact is one root cause for back-reflection in the prior art filter design. In fact, the intensity of back-reflection at a given wavelength depends on a product of transmission, or reflection, and absorption contributions. Often the back-reflected intensity at the cut-off or cut-on wavelength is at a peak. However, since the intensity depends also on absorption, due to the absorption layer, the absorption contribution in the product above can be used to decrease the intensity peak.

In at least one embodiment the overall transmission spectrum and the overall reflection spectrum are complementary such that reflection and transmission are inversely entangled, i.e., considered as mathematical functions, are inverse. The absorption layer can be used to decouple the spectra so that the inverse entanglement no longer holds. This allows for reducing the intensity of back-reflection.

In at least one embodiment the overall transmission spectrum and the overall reflection spectrum are arranged to give the interference filter a long-pass spectrum having at least one spectral cut-on wavelength or a short-pass filter spectrum having at least one spectral cut-off wavelength. Furthermore, at least one absorption peak of the absorption spectrum of the at least one absorption layer matches said cut-off or cut-on wavelength.

The matching of cut-off or cut-on wavelengths with the absorption peak provides an effective way to reduce intensity of back-reflection. As discussed above, the coupling of the overall transmission spectrum and the overall reflection spectrum may lead to a peak in the back-reflection intensity. This peak may coincide with or be close to the cut-off or cut-on wavelength. Thus, by matching with the absorption peak the intensity peak can be reduced. This can be seen from the product discussed above, i.e. the product of transmission, or reflection, and absorption contributions. Absorption counteracts the transmission and reflection contributions and may lead to an overall intensity reduction.

In at least one embodiment the overall transmission spectrum and the overall reflection spectrum are arranged to give the interference filter a band pass filter spectrum having one spectral cut-off or more spectral cut-offs and/or having one spectral cut-on or more spectral cut-ons. At least one absorption peak of the absorption spectrum of the at least one absorption layer matches said one or more cut-offs and/or one or more cut-ons.

In at least one embodiment the optically absorbing material comprises an indium tin oxide compound, denoted as ITO. The ITO compound comprises a ternary composition of indium, tin and oxygen in a given relative proportion. ITO is a high index of refraction material and can be used in the filter stack. ITO conveniently has absorption in the ultraviolet, UV.

In at least one embodiment the substrate comprises a glass, plastic or film substrate. The substrate can be arranged as an absorption filter, e.g. colored glass, and comprises optically absorbing material as well. This way the substrate may contribute to the overall spectral properties of the interference filter hybrid. For example, the substrate can be configured as IR cut filter and the filter stack with the absorption layer cuts in the UV. For this filter design only one type of substrate, e.g. colored glass needs to be used which reduces overall cost of the filter. In at least one embodiment the substrate is a single colored glass which has a cut-off in the infrared, IR.

In at least one embodiment the substrate has an absorption spectrum which is different from the optically absorbing material of the at least one absorption layer. Giving the substrate a defined absorption characteristic allows for more freedom in designing the interference filter.

In at least one embodiment an optical device comprises an optical sensor. The optical sensor is complemented with at least one interference filter according to the aspects discussed above. The resulting optical sensor is less prone to back-reflections which improves signal-to-noise ratio, for example. Furthermore, it has been found that the proposed concept also reduces the impact of spectral shift due to different angles of incidence, which allows for improved spectral and color perception.

In at least one embodiment the optical sensor comprises an image sensor. Image sensors which typically have an array of photodetectors benefit reduce back-reflections, increased signal-to-noise ratio and reduced spectral shift. These allow for applications even under optically unfavorable conditions such as low light, spectral or wide-angle applications.

In at least one embodiment a method of manufacturing an interference filter comprises the steps of providing a substrate and arranging a filter stack on the substrate. The filter stack comprises alternating layers of optical coatings with different refractive indices. Furthermore, at least one absorption layer is arranged on the substrate and comprises an optically absorbing material.

In at least one embodiment the at least one absorption layer is arranged on a surface of the filter stack. Alternatively, or in addition, the at least one absorption layer is arranged between layers of the filter stack.

BRIEF DESCRIPTION OF THE DRAWINGS

In the following, the concept presented above is described in further detail with respect to drawings, in which examples of embodiments are presented. In the embodiments and Figures presented hereinafter, similar or identical elements may each be provided with the same reference numerals. The elements illustrated in the drawings and their size relationships among one another, however, should not be regarded as true to scale, rather individual elements, such as layers, components, and regions, may be exaggerated to enable better illustration or a better understanding.

DETAILED DESCRIPTION

Figure 1A:
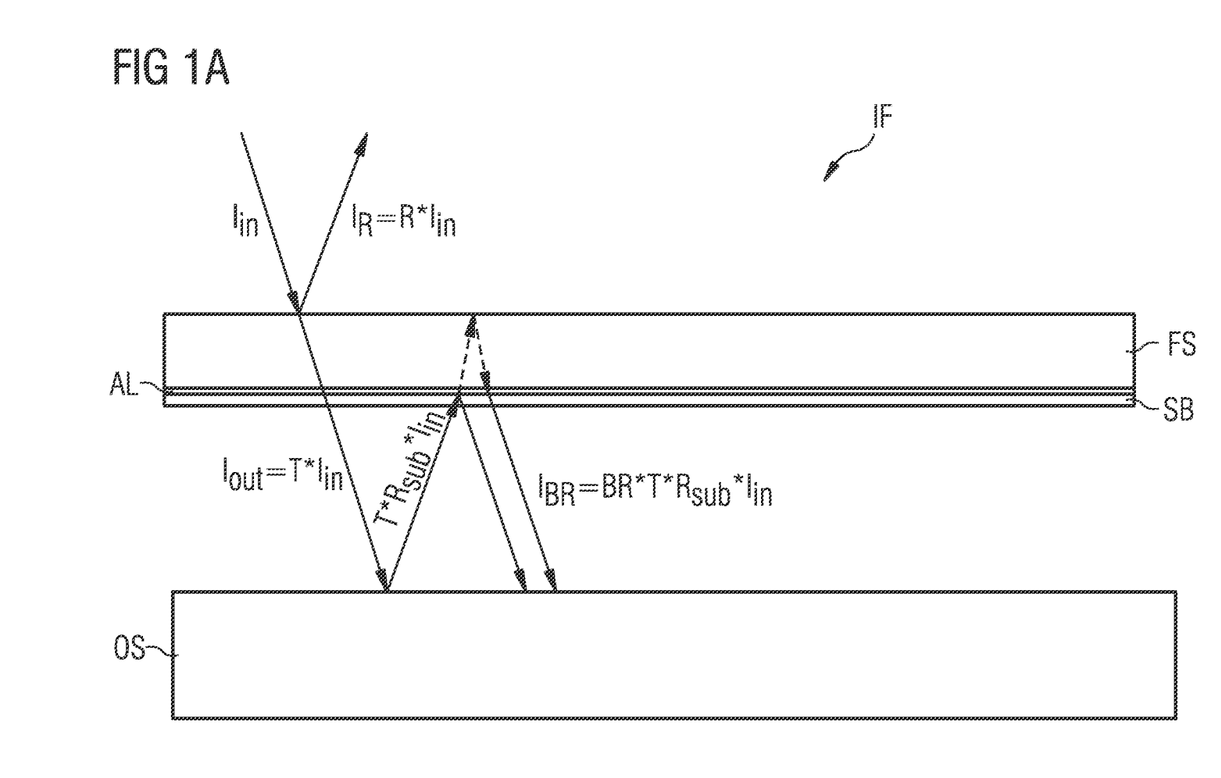
FIGS. 1A to 1C show back-reflection for an example hybrid interference filter.
Figure 1B:
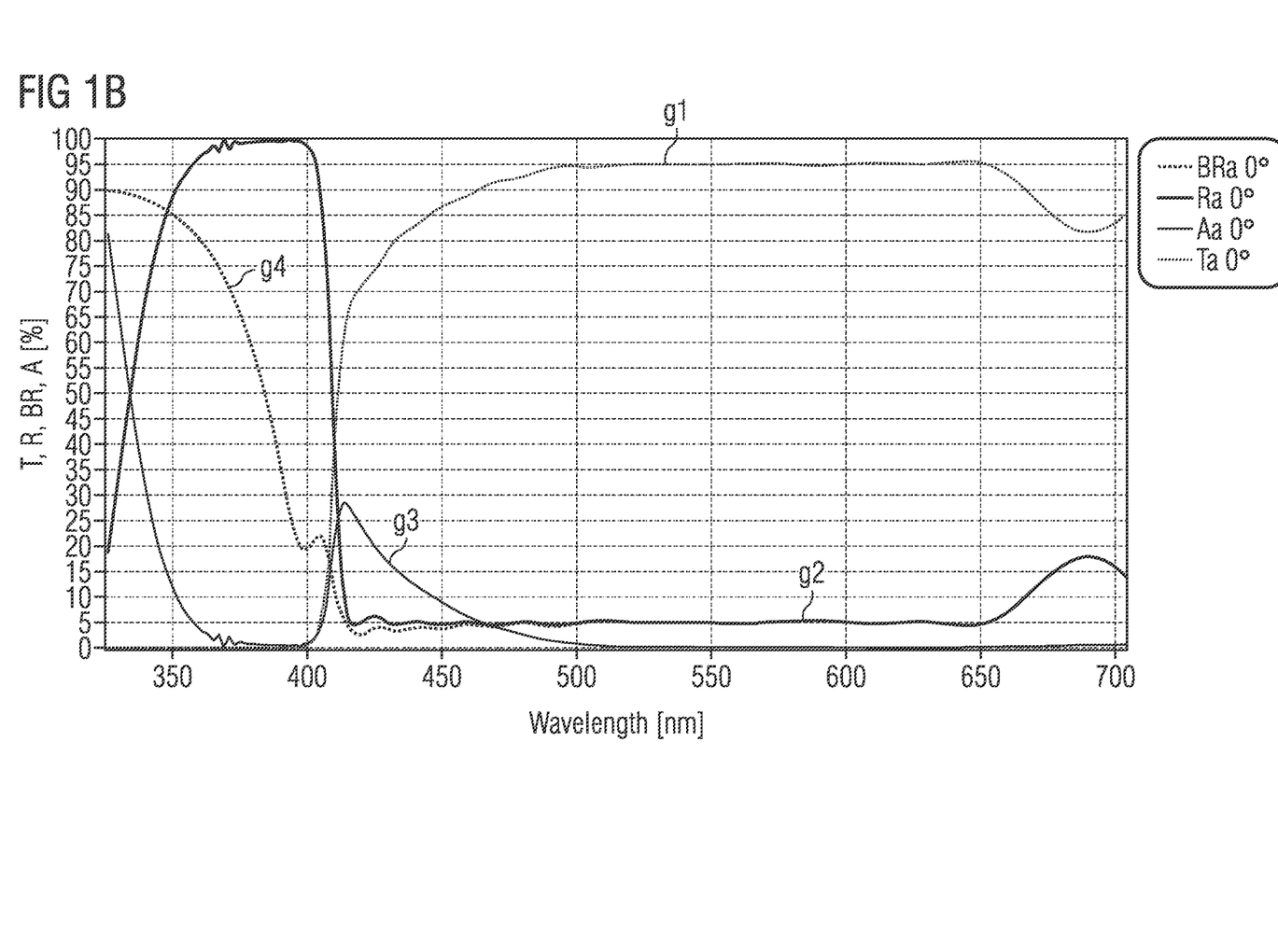
Figure 1C:
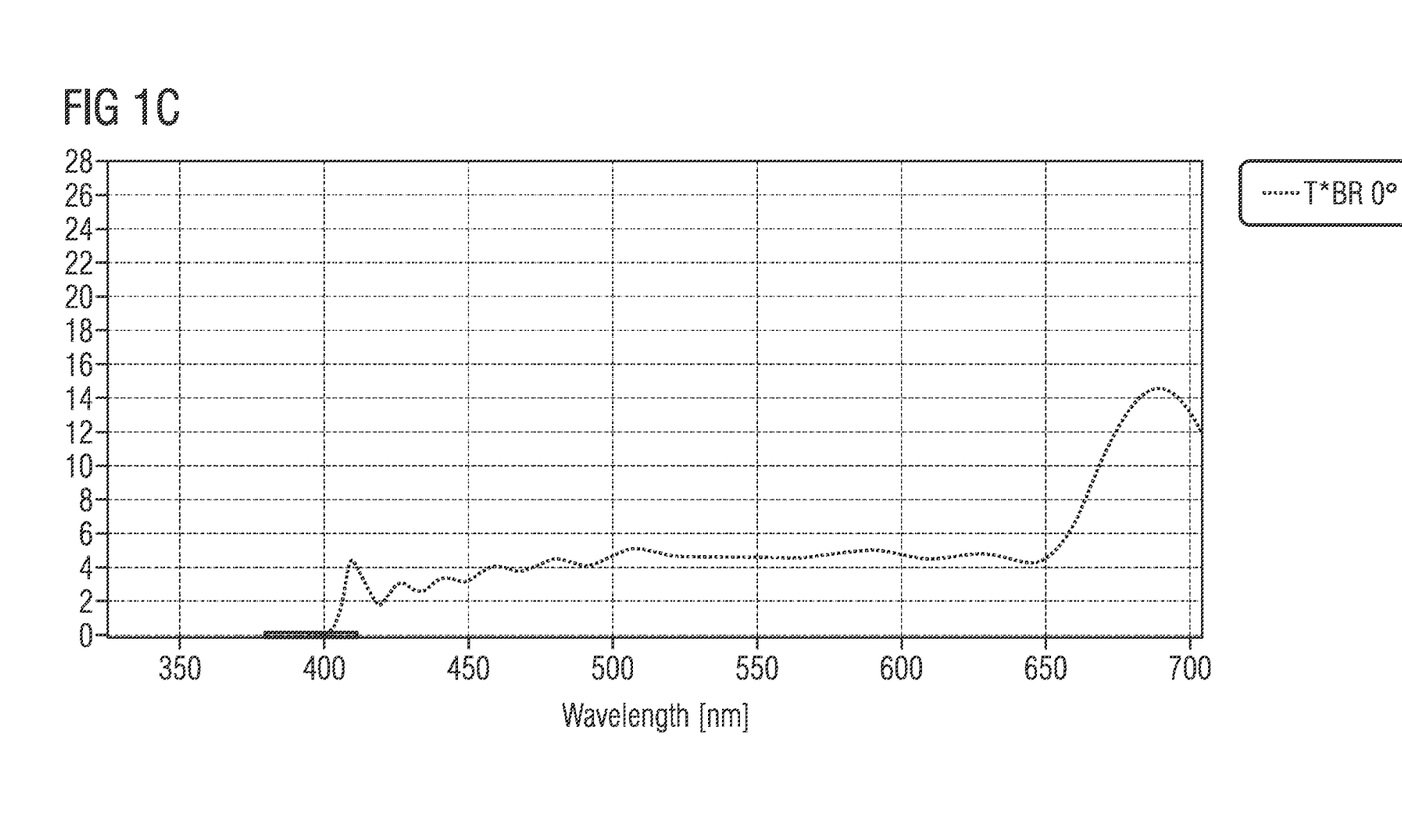

FIGS. 1A to 1C show back-reflection in an example interference filter. FIG. 1A depicts a dichroic filter comprising a substrate SB and a filter stack FS of alternating layers of optical coatings with different refractive indices arranged in a distance to an optical sensor OS, e.g. an image sensor. Furthermore, an absorption layer AL of an optically absorbing material is arranged on the substrate.

The filter stack FS in this example is configured as a long-pass filter which has a cut-on wavelength $\lambda_{cut-on}$ at 412 nm. This cut-on is the result of a dedicated filter design, e.g. based on simulation of the alternating layers of optical coatings with different refractive indices and material properties.

The absorption layer AL is coated on a surface of the filter stack FS. This surface faces the substrate SB, and, thus, the optical sensor OS. The optically absorbing material comprises an indium tin oxide compound, denoted as ITO. The ITO compound comprises a ternary composition of indium, tin and oxygen in a given relative proportion. ITO is a high index of refraction material and has absorption in the ultraviolet, UV. Furthermore, as can be seen from FIG. 1B the ITO compound has an absorption peak close to the cut-on wavelength $\lambda_{cut-on}$ at 412 nm. Thus, the cut-on wavelength and the absorption peak can be considered to match.

The substrate SB is arranged as an absorption filter. In this embodiment the substrate is colored glass which comprises optically absorbing material. The colored glass in this example cuts in the IR. For example, the absorption layer AL and filter stack FS are coated onto the glass using multilayer coatings. This way the colored glass contributes to the overall spectral properties of the interference filter IF, which can be considered a hybrid filter.

For this filter design only one type of substrate, e.g. colored glass needs to be used which reduces overall cost of the filter. The multilayer coatings of the filter stack acts both as an anti-reflection coating, ARC, and as a UV cut-off.

Light is incident with an intensity denoted $I_{in}$. The incident light is partly reflected at the filter stack FS. The reflected light has an intensity of $I_r = R \cdot I_{in}$, wherein R denotes a reflection coefficient, or relative reflection contribution. Some light, however, eventually gets transmitted through the filter stack FS, according to its transmission spectrum. The transmitted intensity is given as $I_{out} = T \cdot I_{in}$, wherein T denotes a transmission coefficient, or relative transmission contribution. The transmitted light may then be reflected at the optical sensor OS, e.g. its substrate, which is given as $T \cdot R_{sub} \cdot I_{in}$, wherein $R_{sub}$ denotes a reflection coefficient, or relative reflection contribution of the optical sensor. Some of this reflected light may be transmitted back into the filter stack, and be subject to additional reflection (see doted arrow in the drawing). Moreover, there may be another reflection at the filter stack FS. This back-reflected light has an intensity of $I_{br} = BR \cdot T \cdot R_{sub} \cdot I_{in}$, wherein BR denotes a back-reflection coefficient, or relative back-reflection contribution. However, due to the absorption layer AL the back-reflection coefficient BR is also depending on the absorption in the absorption layer AL. As a consequence, the intensity $I_{br}$ of the back-reflected light is reduced compared to the situation where no absorption layer AL is present.

FIG. 1B shows transmission and reflection contributions for the interference filter of FIG. 1A. All graphs assume normal incidence. Furthermore, the substrate reflection is assumed to be 100%. The graphs g1 and g2 show the transmission and reflection coefficient introduced above as functions of wavelength, respectively. Graph g3 indicates absorption of the filter stack as a function of wavelength. Finally, graph g4 shows the back-reflection coefficient as a function of wavelength.

The graphs g1 and g2 intersect at the cut-on wavelength. However, it is quite apparent that these graphs are decoupled in the sense that they are no longer inverse for wavelengths larger than the cut-on, as was the case in prior art filters without the absorption layer AL. Furthermore, graph g3 shows a peak which is matched or close to the cut-on wavelength. As a consequence absorption counteracts the transmission and reflection contributions and leads to an overall intensity reduction of back-reflection.

FIG. 1C shows transmission and back-reflection contributions for the interference filter of FIG. 1A. This graph represents a product of back-reflection coefficient BR and transmission coefficient T as functions of wavelength. The peak indicates that the back-reflected intensity is ~5% of the incoming light at the cut-on wavelength. Thus, T and R can be decoupled from each other by introducing the absorption layer and optically absorbing material arranged therein. By shifting the BR to shorter wavelength and lower levels the back-reflected intensity can be reduced by a factor of ~5 compared to an all dielectric filter, e.g. as shown FIGS. 5A to 5C.

Figure 2A:
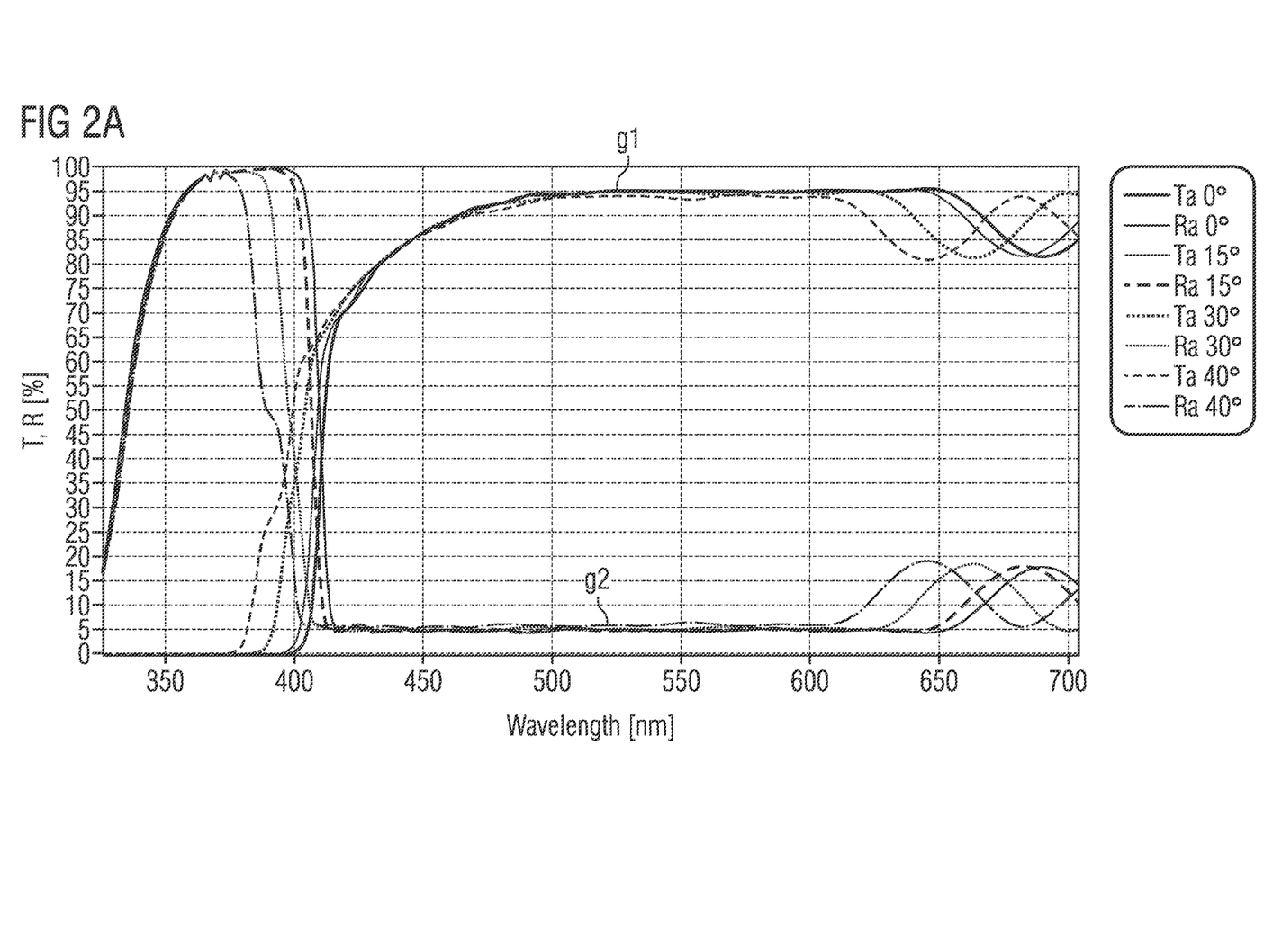
FIGS. 2A to 2B show back-reflection under varying angle of incidence for an example hybrid interference filter.
Figure 2B:
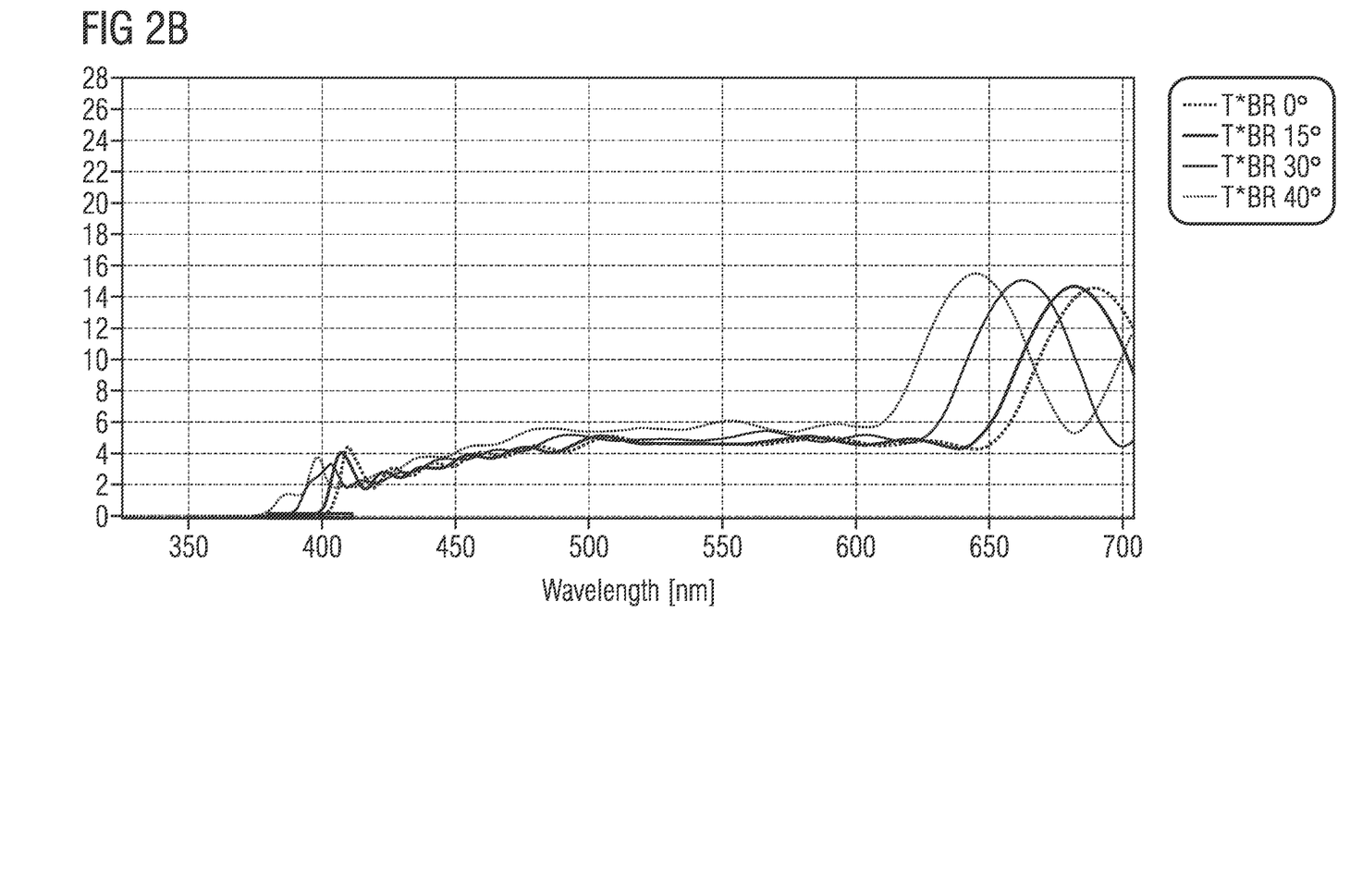

FIGS. 2A and 2B show T, R, and T*BR under varying angle of incidence for an example hybrid interference filter. In fact, the drawings correspond to those in FIGS. 1B and 1C, respectively. The graphs have been established based on the same interference filter as in FIG. 1A. However, the same graphs g1 to g4 are modeled for different angles of incidence, AOI, i.e. 0°, 15°, 30°, and 40°, and are indexed with those angles for easy reference. The situation is similar to normal incidence, i.e. for higher AOIs the maximum back-reflected intensity essentially remains at the low level of about 5%. There is only low spectral broadening.

FIGS. 3A to 3D show further example embodiments of an interference filter. The proposed dichroic filters are based on the one shown in the previous Figures. The filters comprise a substrate SB and a filter stack FS of alternating layers of optical coatings with different refractive indices which are to be arranged in a distance to an optical sensor OS, e.g. an image sensor.

Figure 3A:
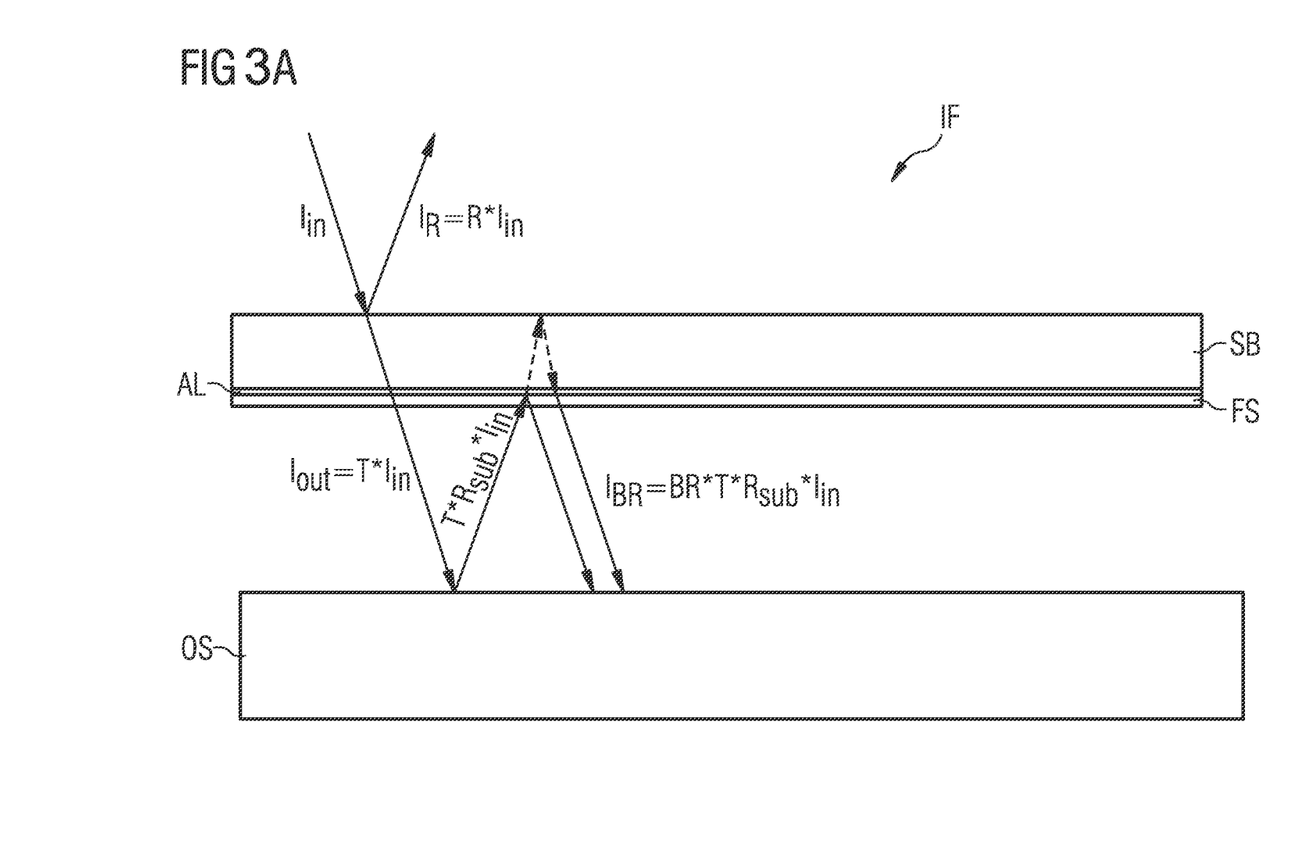
FIGS. 3A to 3D show further example embodiments of an interference filter.

FIG. 3A depicts a dichroic filter based on the one shown in FIG. 1A. The filter comprises a substrate SB and a filter stack FS of alternating layers of optical coatings with different refractive indices arranged in a distance to an optical sensor OS, e.g. an image sensor. Furthermore, an absorption layer AL of an optically absorbing material is arranged on the substrate. The absorption layer AL is coated on a surface of the filter stack FS. This surface faces the substrate SB. As will be shown below, the absorption layer AL can be anywhere in the filter stack, i.e. on a top surface, bottom surface or in-between. In this embodiment, the filter stack FS is arranged on a bottom surface of the substrate, i.e. on a surface facing the optical sensor OS. The layers are not to scale in order to emphasize the relative position of the absorption layer in the filter stack.

As discussed above, light may be incident with an intensity denoted $I_{in}$. The incident light is partly reflected at the filter stack FS. The reflected light has an intensity of $I_r = R \cdot I_{in}$, wherein R denotes a reflection coefficient, or relative reflection contribution. Some light, however, eventually gets transmitted through the filter stack FS, according to its transmission spectrum. The transmitted intensity is given as $I_{out} = T \cdot I_{in}$, wherein T denotes a transmission coefficient, or relative transmission contribution. The transmitted light may then be reflected at the optical sensor OS, e.g. its substrate, which is given as $T \cdot R_{sub} \cdot I_{in}$, wherein $R_{sub}$ denotes a reflection coefficient, or relative reflection contribution of the optical sensor. Some of this reflected light may be transmitted back into the filter stack, and be subject to additional reflection (see doted arrow in the drawing). Moreover, there may be another reflection at the filter stack FS. This back-reflected light has an intensity of $I_{br} = BR \cdot T \cdot R_{sub} \cdot I_{in}$, wherein BR denotes a back-reflection coefficient, or relative back-reflection contribution. However, due to the absorption layer AL the back-reflection coefficient BR is also depending on the absorption in the absorption layer AL. As a consequence, the intensity $I_{br}$ of the back-reflected light is reduced compared to the situation where no absorption layer AL is present.

Figure 3B:
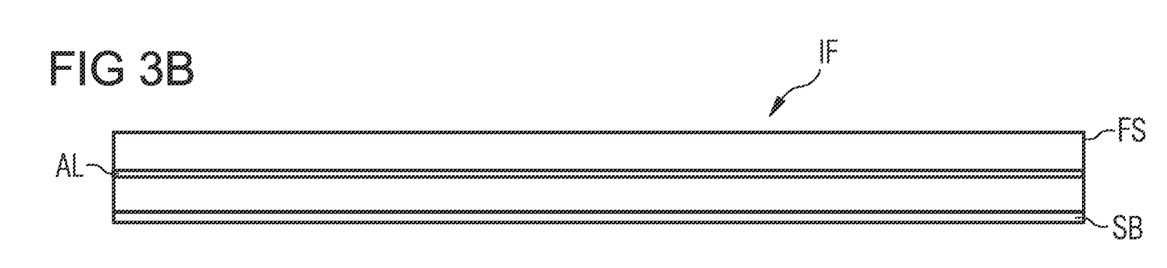
Figure 3C:
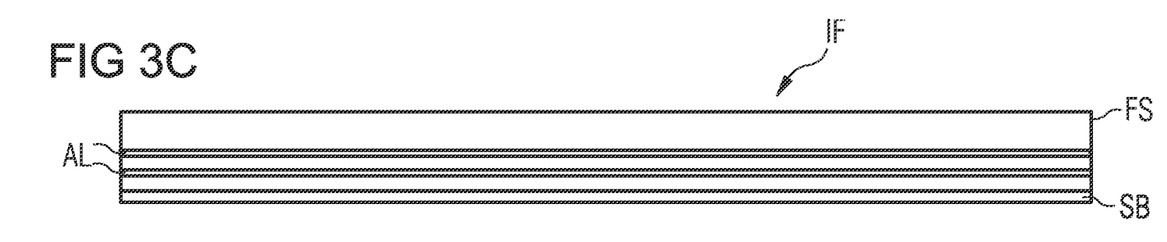
Figure 3D:
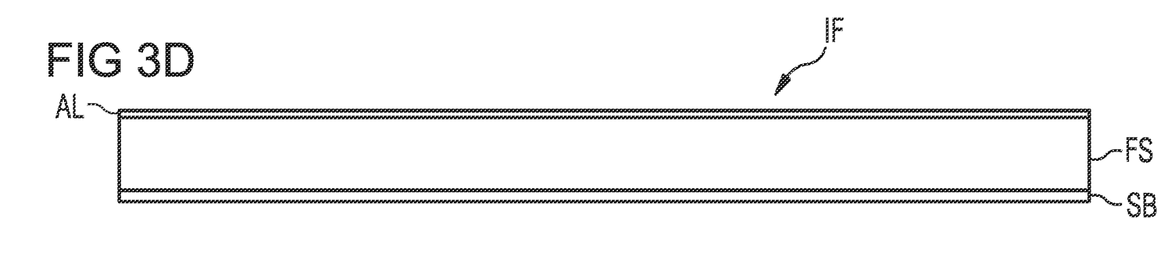

Furthermore, in FIG. 3B one absorption layer AL of an optically absorbing material is arranged between layers of the filter stack FS, i.e. the alternating layers of optical coatings with different refractive indices. In FIG. 3C there are several absorption layers AL arranged between layers of the filter stack. In FIG. 3D the absorption layer AL is on an outer surface (top or bottom) of the filter stack FS. In fact, one or absorption layers AL can be placed anywhere in the filter stack.

The absorption layers (one or more) are associated with the filter stack in the sense that the absorption layers can be considered an integral part of the filter stack, e.g. as one of the alternating layers or an additional layer of the filter stack. In other words, the alternating layers of optical coatings and the absorption layer make up the interference filter. In terms of filter design the overall transmission spectrum and the overall reflection spectrum are no longer coupled or entangled in the sense that they inverse functions. Rather the contribution of the one or more absorption layers need to be accounted for. Transmission, reflection and absorption need to meet the general requirement that the product of transmission, reflection and absorption equals 1.

Including the absorption layer(s) as integral part of the filter stack allows to avoid the need for these additional absorbing materials by carefully selecting the optical constants of the materials in the interference filter itself. In other words, the interference filter multilayer structure no longer only relies on the typical T and R, but incorporates materials with an absorbing function. The layers not only interfere constructively and destructively, they also absorb at specific wavelengths according to the intended application. This is quite a different approach compared to prior art, where typically optical filter design for interference filters targets using materials with no absorption. However, here the argument is put forward that for applications, such as image sensors, some absorption in the interference filter can be advantageous, e.g. in reducing back reflection. The proposed concept simplifies the overall design by avoiding the need for additional absorbing materials, for example colored glass, colored resins or dyes.

The invention claimed is:

1. An interference filter, comprising:
a substrate;
a filter stack comprising alternating layers of optical coatings with different refractive indices arranged on the substrate; and
at least one absorption layer of an optically absorbing material arranged on the substrate, wherein
the layers of optical coatings are characterized by an overall transmission spectrum and an overall reflection spectrum that are arranged to give the interference filter one of a long-pass spectrum having at least one spectral cut-on wavelength, a short-pass spectrum having at least one spectral cut-off wavelength, or a band-pass filter spectrum having at least one spectral cut-on wavelength and at least one spectral cut-off wavelength,
the spectral cut-on wavelength corresponds to a wavelength at which the transmission increases to 50% throughput,
the spectral cut-off wavelength corresponds to a wavelength at which the transmission decreases to 50% throughput, and
at least one absorption peak of an absorption spectrum of the at least one absorption layer matches the spectral cut-off wavelength and/or spectral cut-on wavelength.

2. The interference filter according to claim 1, wherein
the at least one absorption layer is arranged on a surface of the filter stack, and/or
the at least one absorption layer is arranged between layers of the filter stack.

3. The interference filter according to claim 1,
wherein the optically absorbing material comprises an Indium
tin oxide compound, denoted ITO, comprising a ternary composition of indium, tin and oxygen in a given relative proportion.

4. The interference filter according to claim 1, wherein the substrate comprises a glass, plastic or film substrate.

5. The interference filter according to claim 1, wherein the substrate has an absorption spectrum different from the optically absorbing material of the at least one absorption layer (AL).

6. The interference filter according to claim 1, wherein the substrate facing the filter stack has a finite distance to the at least one absorption layer.

7. An optical device comprising
an optical sensor, and
at least one interference filter according to claim 1.

8. The optical device according to claim 7, wherein the optical sensor comprises an image sensor.

9. A method of manufacturing an interference filter, comprising:
providing a substrate,
arranging a filter stack on the substrate, the filter stack comprising alternating layers of optical coatings with different refractive indices, and
arranging at least one absorption layer of an optically absorbing material on the substrate, wherein
the layers of optical coatings are characterized by an overall transmission spectrum and an overall reflection spectrum that are arranged to give the interference filter one of a long-pass spectrum having at least one spectral cut-on wavelength, a short-pass spectrum having at least one spectral cut-off wavelength, or a band-pass filter spectrum having at least one spectral cut-on wavelength and at least one spectral cut-off wavelength,
the spectral cut-on wavelength corresponds to a wavelength at which the transmission increases to 50% throughput,
the spectral cut-off wavelength corresponds to a wavelength at which the transmission decreases to 50% throughput, and
at least one absorption peak of an absorption spectrum of the at least one absorption layer matches the spectral cut-off wavelength and/or spectral cut-on wavelength.

10. The method according to claim 9, wherein
the at least one absorption layer is arranged on a surface of the filter stack, and/or
the at least one absorption layer is arranged between layers of the filter stack.

* * * * *